J. L. ROSS.
CHUTE FOR FREIGHT CARS.
APPLICATION FILED AUG. 21, 1914.
1,151,719.
Patented Aug. 31, 1915.
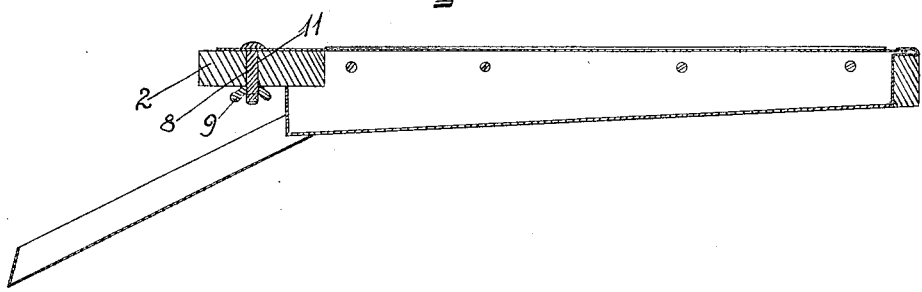
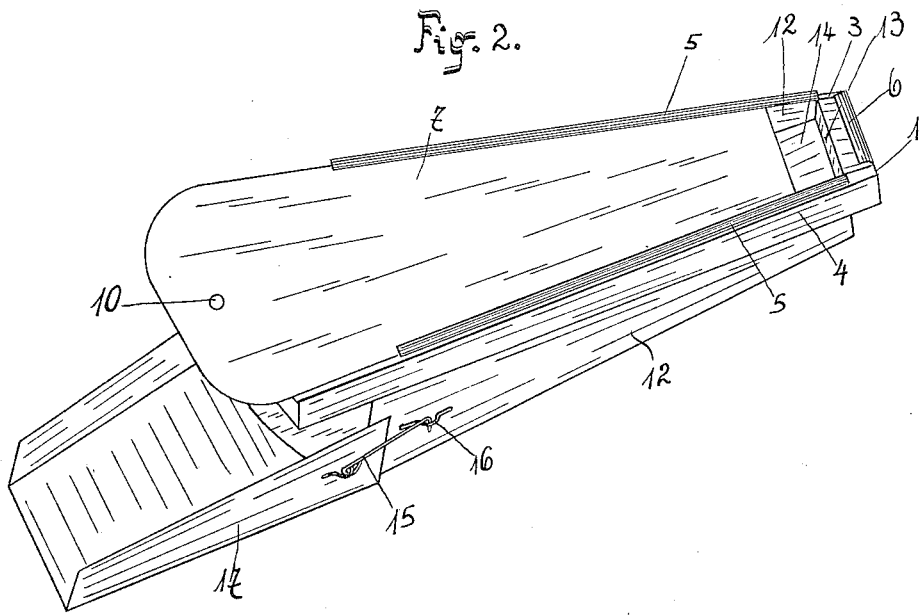
WITNESSES
A. Kempler
W. A. Dudd.
INVENTOR
J. L. Ross.
By Henry C. Evert
ATTORNEY

UNITED STATES PATENT OFFICE.

JOSEPH LAWRENCE ROSS, OF MONONGAHELA, PENNSYLVANIA.

CHUTE FOR FREIGHT-CARS.

1,151,719.  Specification of Letters Patent.  Patented Aug. 31, 1915.

Application filed August 21, 1914. Serial No. 857,959.

*To all whom it may concern:*

Be it known that I, JOSEPH LAWRENCE Ross, a citizen of the United States of America, residing at Monongahela city, in the county of Washington and State of Pennsylvania, have invented certain new and useful Improvements in Chutes for Freight-Cars, of which the following is a specification, reference being had therein to the accompanying drawing.

This invention relates to chutes for use in connection with freight cars, more particularly freight cars for transporting grain, and has for its object to provide a device of such class, in a manner as hereinafter set forth, to provide for the convenient discharge of the grain from the car when the occasion so requires.

Further objects of the invention are to provide a chute for the purpose set forth, which is simple in its construction and arrangement, strong, durable, efficient in its use, readily set up with respect to the floor of the car, and inexpensive.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a longitudinal sectional view of a chute in accordance with this invention. Fig. 2 is a perspective view thereof.

Referring to the drawings in detail the chute comprises a frame formed of an inner bar 1, and outer bar 2, a pair of side bars 3 and 4. The bar 2 is of greater length than the bar 1 and the latter is arranged between the bars 3 and 4 at the inner ends of this latter. The bars 3 and 4 incline toward each other whereby a frame is formed, which when in operative position greatly decreases in width inward. The frame is secured to the lower face of the floor of the car directly below an opening in the floor.

The bars 3 and 4 are provided on their top edges with guides 5, and the bar 1 has secured to its top edge a stop 6. Slidably mounted in the guides 5 and capable of being over-lapped by the stop 6, is a slide 7, which is adapted to close the top of the frame and when in such position also close the opening in the floor of the car, such an opening constituting the outlet for the grain. When the slide 7 is in closed position, it is secured against movement, by a bolt 8 and a nut 9. The bolt extends down through an opening 10 in the outer end of the slide 7 and through an opening 11 in the bar 2. The nut 9 is carried on the lower end of a bolt 8 and when screwed home engages the lower face of the bar 2.

Suspended from the frame 1 is a casing comprising a pair of side walls 12, an end wall 13, and an inclined bottom 14. The walls 12 and 13 are extended up through the frame and bent over to top edges of the walls 1, 3 and 4 and then bent upon themselves to provide the guides 5, and the stop 6. The bottom 14 of the casing inclines downward and outward and said casing is open at its outer end and is of less length than the frame.

Detachably connected to the outer end of the casing, which is termed a conducting casing, through the medium of the hooks 15 and keepers 16, only one hook and keep is shown, is a channel shaped inclined conducting spout 17, which when not in use is positioned in a conducting casing and secured therein in any suitable manner.

What I claim is.

1. A chute for the purpose set forth comprising a frame and conducting casing suspended from said frame, open at its forward end and having a downwardly and outwardly inclined bottom a slide for closing the top of said frame, and an inclined conducting chute detachably connected to the open end of said casing, said casing having the walls thereof extended and bent upon themselves, and guides and a stop for said slide.

2. A chute for the purpose set forth, comprising a frame and conducting casing suspended from said frame, open at its forward end and having a downwardly and outwardly inclined bottom a slide for closing the top of said frame, and an inclined conducting chute detachably connected to the open end of said casing, said casing having the walls thereof extended and bent upon themselves, and guides and a stop for said slide, and means for securing said slide in closed position.

In testimony whereof I affix my signature in the presence of two witnesses.

JOSEPH LAWRENCE ROSS.

Witnesses:
L. P. WARNE,
L. MILHOAN.